US 12,545,164 B2

United States Patent
Imamura et al.

(10) Patent No.: US 12,545,164 B2
(45) Date of Patent: Feb. 10, 2026

(54) HEADREST STAY AND RETAINING STRUCTURE

(71) Applicants: NHK SPRING CO., LTD., Yokohama (JP); SUBARU CORPORATION, Tokyo (JP)

(72) Inventors: Kiyohito Imamura, Yokohama (JP); Shogo Nakamura, Yokohama (JP); Tatsuya Sawada, Tokyo (JP); Masafumi Takano, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 212 days.

(21) Appl. No.: 18/469,165

(22) Filed: Sep. 18, 2023

(65) Prior Publication Data

US 2024/0092242 A1 Mar. 21, 2024

(30) Foreign Application Priority Data

Sep. 20, 2022 (JP) .................. 2022-149554

(51) Int. Cl.
*B60N 2/818* (2018.01)
*B60N 2/80* (2018.01)
(Continued)

(52) U.S. Cl.
CPC ............. *B60N 2/818* (2018.02); *B60N 2/897* (2018.02); *B60N 2/888* (2018.02); *B60N 2002/899* (2018.02)

(58) Field of Classification Search
CPC ..................................................... B60N 2/818
See application file for complete search history.

(56) References Cited

U.S. PATENT DOCUMENTS

| 5,895,094 A | 4/1999 | Mori et al. | |
| 2011/0031795 A1* | 2/2011 | Arcidiacone | ......... B21D 17/02 |
| | | | 297/391 |

(Continued)

FOREIGN PATENT DOCUMENTS

| JP | H08-090125 A | 4/1996 |
| JP | H08-090126 A | 4/1996 |

(Continued)

OTHER PUBLICATIONS

Office Action issued in Japanese Application No. 2022-149554, dated Dec. 2, 2025.

*Primary Examiner* — David R Dunn
*Assistant Examiner* — Tania Abraham
(74) *Attorney, Agent, or Firm* — Knobbe, Martens, Olson & Bear, LLP (57) ABSTRACT

A headrest stay includes a detachment prevention slot portion formed in a rod-shaped leg portion, the detachment prevention slot portion being recessed toward a center side of the leg portion, the lock portion being configured to enter into the detachment prevention slot portion, and the detachment prevention slot portion including: a first flat face portion that faces a lower side; and a second flat face portion that faces an upper side, the second flat face portion including: an opposing portion that opposes the first flat face portion; and a region that, in a vertical sectional diagram cut along the axial direction of the leg portion, is disposed at an outer peripheral side of the leg portion relative to the first flat face portion.

7 Claims, 6 Drawing Sheets

(51) Int. Cl.
*B60N 2/888* (2018.01)
*B60N 2/897* (2018.01)

(56) References Cited

U.S. PATENT DOCUMENTS

| | | | | |
|---|---|---|---|---|
| 2015/0001908 A1* | 1/2015 | Hagan | ............... | F16C 33/1095 |
| | | | | 297/410 |
| 2015/0114072 A1* | 4/2015 | Baudy | ............... | B60N 2/818 |
| | | | | 72/370.04 |

FOREIGN PATENT DOCUMENTS

| | | | |
|---|---|---|---|
| JP | H09-276072 | A | 10/1997 |
| JP | 2008-265617 | A | 11/2008 |
| JP | 5612989 | B2 | 10/2014 |
| JP | 2014-217539 | A | 11/2014 |

* cited by examiner

HEADREST STAY AND RETAINING STRUCTURE

CROSS-REFERENCE TO RELATED APPLICATION

This application is based on and claims priority under 35 USC 119 from Japanese Patent Application No. 2022-149554 filed on Sep. 20, 2022, the disclosure of which is incorporated by reference herein.

BACKGROUND

Technical Field

The present disclosure relates to a headrest stay and to a retaining structure thereof.

Related Art

A structure is known (for example, see Japanese Patent No. 5,612,989) in which a headrest stay is inserted to be vertically movable in a headrest support disposed at an upper end portion side of a seatback. In a related technology equipped with this structure, in order to retain the headrest stay, for example, a structure may be employed in which a notch (a detachment prevention slot portion) is formed in a leg portion of the headrest stay to be recessed toward a center side of the leg portion, and a lock portion is provided at the headrest support which lock portion enters into the notch due to urging force of a spring.

However, with this structure, depending on specifications of the shape and dimensions of the notch and suchlike, the headrest stay may detach from the headrest support when the headrest stay acts to move at high speed during a frontal collision or the like. Thus, there is scope for improvement.

SUMMARY

The present disclosure provides a headrest stay and a retaining structure thereof that may, with a simple structure, prevent the headrest stay detaching from a headrest support when the headrest stay acts to move to the upper side at a high speed.

A headrest stay according to a first aspect of the present disclosure is configured to be inserted from an upper side into a headrest support and to be mounted thereat, the headrest support being formed as a tube, and a lock portion being provided at the headrest support, the lock portion being configured to project from and retract into an inner peripheral face of the tube while being urged toward an inner side of the tube. The headrest stay according to the first aspect includes a detachment prevention slot portion formed in a rod-shaped leg portion that is inserted into the headrest support, the detachment prevention slot portion being recessed toward a center side of the leg portion, the lock portion being configured to enter into the detachment prevention slot portion, and the detachment prevention slot portion including: a first flat face portion that is a flat face along a direction orthogonal to an axial direction of the leg portion and that faces a lower side; and a second flat face portion that is a flat face along another direction orthogonal to the axial direction of the leg portion and that faces an upper side, the second flat face portion including: an opposing portion that opposes the first flat face portion; and a region that, in a vertical sectional diagram cut along the axial direction of the leg portion, is disposed at an outer peripheral side of the leg portion relative to the first flat face portion.

According to the structure described above, the detachment prevention slot portion is formed in the rod-shaped leg portion, which is inserted into the headrest support, and is recessed toward the center side of the leg portion. The lock portion may enter into this detachment prevention slot portion. The detachment prevention slot portion is provided with the first flat face portion and the second flat face portion. The first flat face portion is a flat face along the direction orthogonal to the axial direction of the leg portion and faces the lower side. The second flat face portion is a flat face along the another direction orthogonal to the axial direction of the leg portion and faces the upper side. The second flat face portion includes the opposing portion opposing the first flat face portion, and includes the region that is disposed further to the outer peripheral side of the leg portion than the first flat face portion in a vertical sectional view cut along the axial direction of the leg portion. Therefore, when the headrest stay acts to move to the upper side at high speed, for example, during a frontal collision or the like, a distal end portion of the lock portion may abut against the second flat face portion even if the lock portion cannot enter into an opposition space of the detachment prevention slot portion between the first flat face portion and the second flat face portion. When the distal end portion of the lock portion abuts against the second flat face portion, displacement of the headrest stay is restricted, and the lock portion may enter into the opposition space of the detachment prevention slot portion between the first flat face portion and the second flat face portion. Thus, detachment of the headrest stay from the headrest support may be prevented with a simple structure.

In a headrest stay according to a second aspect of the present disclosure, in the structure of the first aspect, an upper side angled face portion is formed at the leg portion, the upper side angled face portion is provided adjacent to the upper side of the detachment prevention slot portion, is angled, from an upper end to the lower side, toward the center side of the leg portion, and is connected to an edge at an outer peripheral side of the first flat face portion.

According to the structure described above, the upper side angled face portion formed at the leg portion is provided adjacent to the upper side of the detachment prevention slot portion, is angled toward the center side of the leg portion from the upper end thereof to the lower side, and is connected to the edge at the outer peripheral side of the first flat face portion. Therefore, when the headrest stay acts to move to the upper side at high speed, the upper side angled face portion may guide the lock portion so as to facilitate entry into the opposition space of the detachment prevention slot portion between the first flat face portion and the second flat face portion.

In a headrest stay according to a third aspect of the present disclosure, in the structure of the second aspect, a virtual straight line that extends toward the upper side in parallel with the axial direction of the leg portion from an edge at an outer peripheral side of the second flat face portion, intersects with a region of the upper side angled face portion other than an upper edge thereof.

According to the structure described above, even if, for example, an undercut is formed in a region adjacent to the lower side of the edge of the outer peripheral side of the second flat face portion due to press-forming, an effective structure is formed. Thus, fabrication may be easier.

In a headrest stay according to a fourth aspect of the present disclosure, in the structure of the first aspect, a lower side angled face portion is formed at the leg portion, the lower side angled face portion is provided adjacent to the lower side of the detachment prevention slot portion, is angled, from a lower end to the upper side, toward the center side of the leg portion, and is connected to an edge at an outer peripheral side of the second flat face portion.

According to the structure described above, the lower side angled face portion formed at the leg portion is provided adjacent to the lower side of the detachment prevention slot portion, is angled toward the center side of the leg portion from the lower end to the upper side, and is connected to the edge at the outer peripheral side of the second flat face portion. That is, this structure tolerates an undercut formed in the region adjacent to the lower side of the edge of the outer peripheral side of the second flat face portion due to press-forming. Therefore, fabrication by press-forming may be easier.

In a headrest stay according to a fifth aspect of the present disclosure, in the structure of the first aspect, plural height adjustment recess portions are formed in the leg portion, the height adjustment recess portions being recessed toward the center side of the leg portion, the lock portion being configured to enter into the height adjustment recess portions, and the height adjustment recess portions being arrayed in a line along the axial direction of the leg portion. The detachment prevention slot portion is formed at a position arrayed in a line with the plural height adjustment recess portions.

According to the structure described above, the plural height adjustment recess portions that are recessed toward the center side of the leg portion are formed in the leg portion so as to be arrayed in a line along the axial direction of the leg portion. The lock portion is capable of entering the height adjustment recess portions. In this structure, the detachment prevention slot portion is formed at the position arrayed in a line with the plural height adjustment portions. Therefore, the lock portion may be employed as inserting means into both the height adjustment recess portions and the detachment prevention slot portion. Thus, structures may be simplified.

In a headrest stay according to a sixth aspect of the present disclosure, in the structure of the first aspect, plural height adjustment recess portions are formed in the leg portion, the height adjustment recess portions being recessed toward the center side of the leg portion, being configured for engagement at a time of height adjustment of the headrest stay, and being arrayed in a line along the axial direction of the leg portion. The detachment prevention slot portion is disposed at a lower side in the axial direction of the leg portion relative to a lowermost height adjustment recess portion of the plural height adjustment recess portions, or at a same height position in the axial direction of the leg portion as the lowermost height adjustment recess portion.

According to the structure described above, the height adjustment recess portions may be utilized to adjust a height of the headrest stay, and the detachment prevention slot portion may be utilized to prevent detachment of the headrest stay from the headrest support when the headrest stay acts to move to the upper side at high speed.

In a headrest stay according to a seventh aspect of the present disclosure, in the structure of the first aspect, the detachment prevention slot portion is formed so as to ensure a length of at least 0.3 mm in a slot depth direction of a mutual opposition region between the first flat face portion and the second flat face portion.

According to the structure described above, when the lock portion enters into the opposition space of the detachment prevention slot portion between the first flat face portion and the second flat face portion, disengagement of the lock portion may be excellently prevented.

A headrest stay retaining structure according to an eighth aspect of the present disclosure including: the headrest stay according to any one of the first to seventh aspects; a headrest support formed as a tube, the headrest stay being inserted into the headrest support from an upper side and being mounted thereat; and a lock portion provided at the headrest support, the lock portion being configured to project from and retract into a tube inner peripheral face of the headrest support while being urged toward a tube inner side of the headrest support, wherein an opposition space between the first flat face portion and the second flat face portion has a thickness in a direction of opposition between the first flat face portion and second flat face portion that is a factor of from 1.4 to 2.0 times a thickness of the lock portion.

According to the structure described above, because the opposition space between the first flat face portion and the second flat face portion is specified to have a thickness of at least 1.4 times the thickness of the lock portion in the direction of opposition between the first flat face portion and the second flat face portion, specification for the lock portion to enter into the opposition space of the detachment prevention slot portion between the first flat face portion and the second flat face portion when the headrest stay acts to move to the upper side at high speed is easier. Further, because the opposition space between the first flat face portion and the second flat face portion is specified to have a thickness of at most 2.0 times the thickness of the lock portion in the direction of opposition between the first flat face portion and the second flat face portion, rattling of the lock portion inserted into the opposition space of the detachment prevention slot portion between the first flat face portion and the second flat face portion may be suppressed.

As described above, according to the present disclosure, an excellent effect is provided in that, with a simple structure, a headrest stay may be prevented from detaching from a headrest support when the headrest stay acts to move to the upper side at a high speed.

BRIEF DESCRIPTION OF THE DRAWINGS

An exemplary embodiment of the present disclosure will be described in detail based on the following figures, wherein.

DETAILED DESCRIPTION

A headrest stay 40 according to an exemplary embodiment of the present disclosure and a retaining structure thereof are described using FIG. 1 to FIG. 7. An arrow FR that is shown as appropriate in these drawings indicates a vehicle front side, an arrow UP indicates a vehicle upper side, and an arrow W indicates a vehicle width direction (a seat left-and-right direction). With a view to aiding understanding of the drawings, some reference symbols may be omitted from the drawings.

—Structure—

Figure 1:
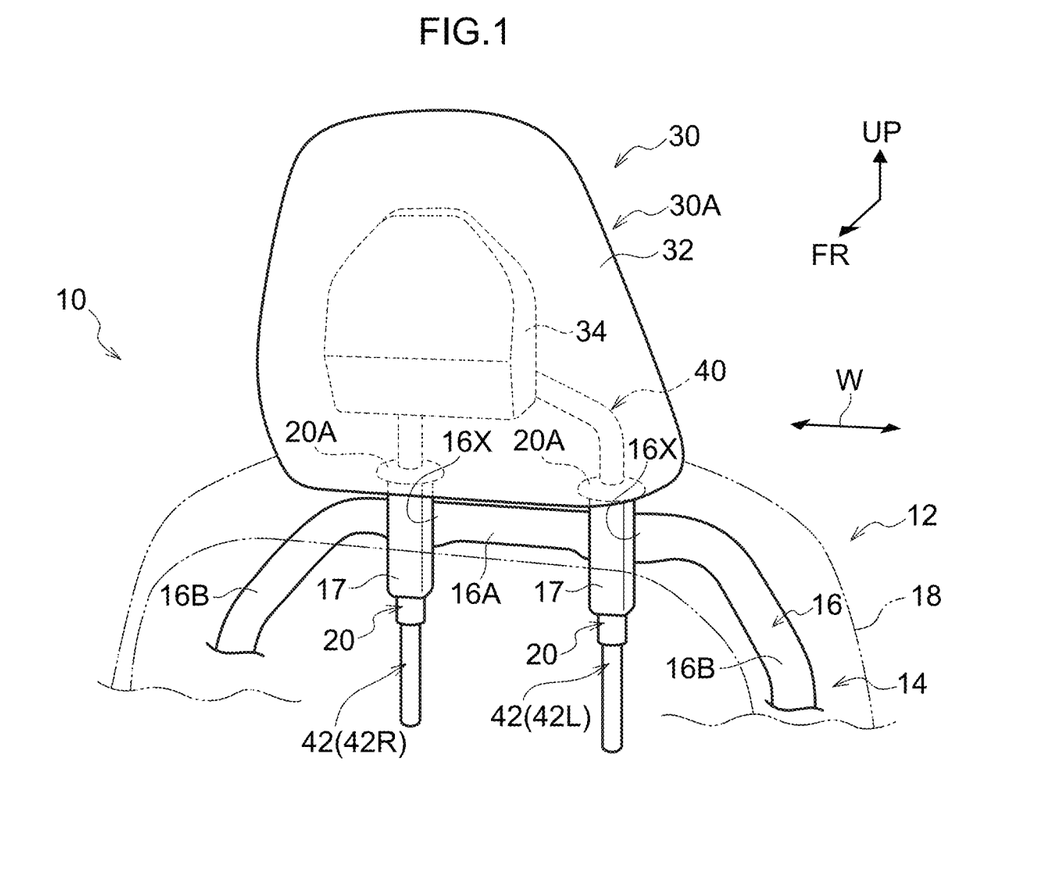
FIG. 1 is a perspective view showing a portion of a vehicle seat with a structure employing a headrest stay and retaining structure according to an exemplary embodiment of the present disclosure.

FIG. 1 shows a perspective view of a portion of a vehicle seat 10 with a structure employing the headrest stay 40 and retaining structure according to the present exemplary embodiment. The vehicle seat 10 is provided with a seat cushion (not shown in the drawings) that supports a buttock area and thigh area of a seat occupant, a seatback 12 that supports a back area of the seat occupant, and a headrest 30 that supports a head area of the seat occupant. A test dummy (HYBRID III, AM 50) used in sled tests simulating frontal collisions is seated on the vehicle seat 10. In FIG. 1, for convenience, the exterior of the seatback 12 is depicted by two-dot chain lines, a back frame 14 that is a framework member of the seatback 12 is illustrated, and a back pad (a cushion member) that covers the back frame 14 is not shown in the drawings. A front face of the seatback 12 is structured with a trim cover 18.

The back frame 14 of the seatback 12 is provided with a left and right pair of side frames (not shown in the drawings) that extend in the seatback height direction, and an upper frame 16 in a long, narrow pipe shape that links upper end portions of the left and right pair of side frames. The upper frame 16 is formed substantially in a wide, inverted "U" shape in a seat front view by, for example, bending machining of a pipe member fabricated of metal. The upper frame 16 is provided with a width direction extending portion 16A that extends in the seat width direction, and a left and right pair of side portions 16B that are bent and extend to the lower side from both of end portions of the width direction extending portion.

Crushed portions 16X to which crushing machining is applied are formed at a portion of the right side and a portion of the left side of the width direction extending portion 16A of the upper frame 16. Each crushed portion 16X is formed in a shape that is crushed in the seat front-and-rear direction. A left and right pair of tube-shaped holders 17 for connecting the headrest 30 are fixed by welding at front side portions of the left and right pair of crushed portions 16X. A headrest support 20 (also referred to as a headrest bush or a bush) is inserted in the tube of each holder 17. Each headrest support 20 is fabricated of resin and formed in the tube shape. A head portion 20A that broadens to radial direction outer sides is formed at an upper end portion of each headrest support 20. The head portions 20A are exposed at an upper end portion of the seatback 12.

The headrest 30 has a structure in which an upper portion of the headrest stay 40, which is a framework member, is covered by a headrest pad (not shown in the drawings), which is a cushion member, and a front face of the headrest pad is covered with a trim cover 32, which is a skin material. A region of the headrest pad (not shown in the drawings) that is covered by the trim cover 32 constitutes a headrest main body 30A. As an example in the present exemplary embodiment, an interior structure member 34 that structures the interior of the headrest main body 30A is attached to a region at an upper end portion side of an upper portion of the headrest stay 40 so as to cover the front side of this region.

The headrest stay 40 is formed substantially in an inverted "U" shape (see FIG. 3) by, for example, bending machining of a pipe member fabricated of metal. The headrest stay 40 is provided with rod-shaped leg portions 42 that extend downward from the interior of the headrest main body 30A. A left and right pair of the leg portions 42 of the headrest stay 40 are inserted into and mounted at the left and right pair of headrest supports 20 from the upper side, and are connected to the upper end portion of the back frame 14 via the left and right pair of headrest supports 20 and the left and right pair of holders 17. In the drawings, the reference symbol 42L is marked in parentheses after the reference symbol 42 at one of the pair of leg portions 42, and the reference symbol 42R is marked in parentheses after the reference symbol 42 at the other of the pair of leg portions 42.

Figure 2:
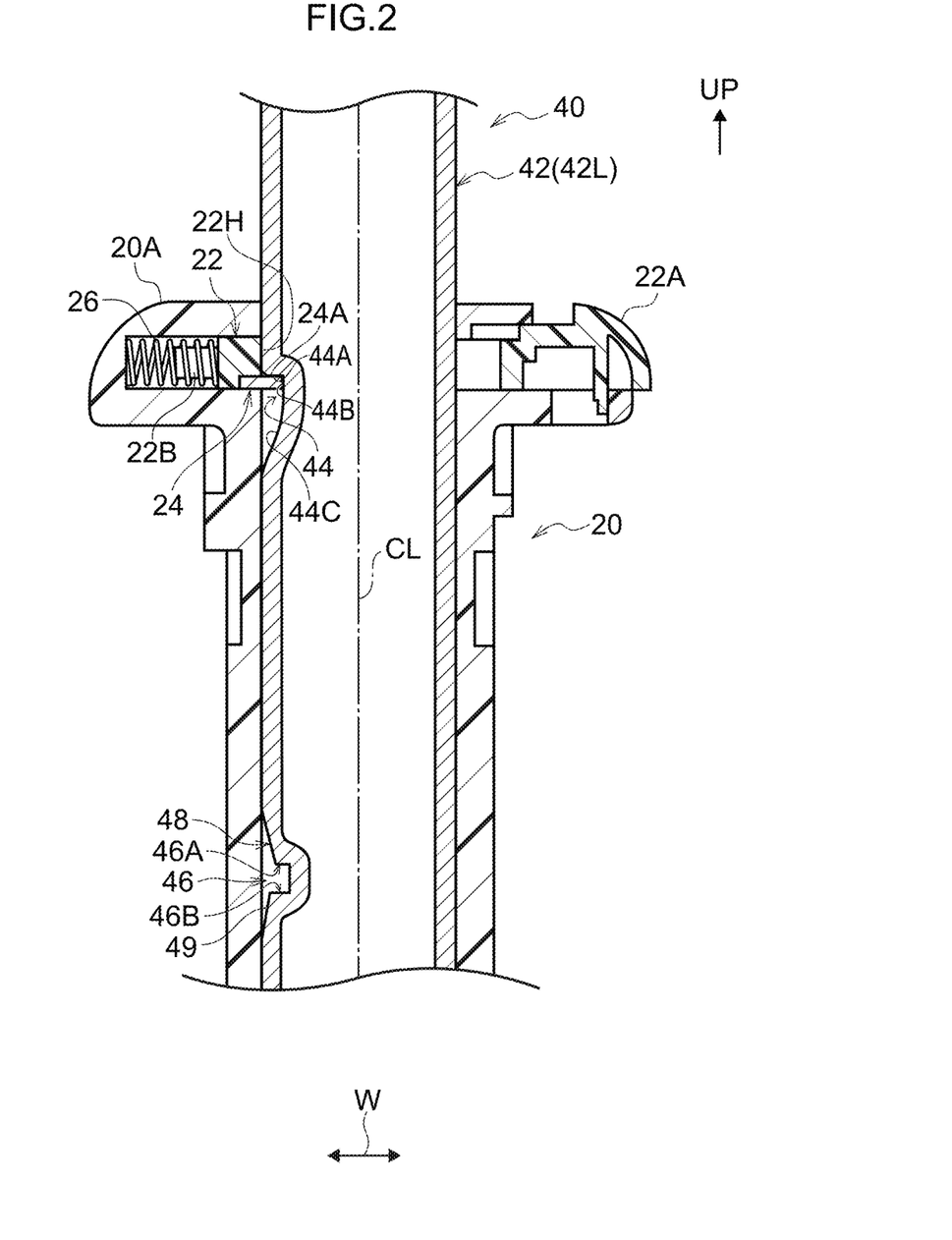
FIG. 2 is a vertical sectional diagram showing a state in which the headrest stay is inserted into a headrest support in FIG. 1.
Figure 5:
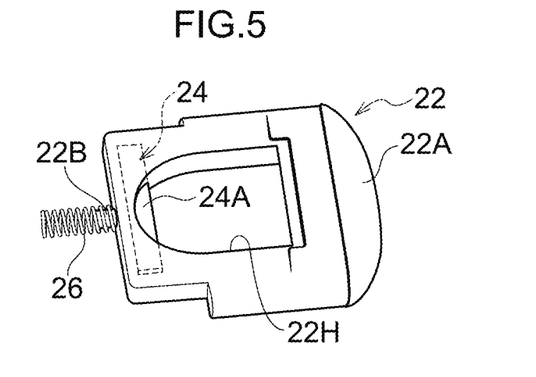
FIG. 5 is a perspective view showing overall structure of a unit in FIG. 2 that is equipped with a locking member, a lock plate and a return spring.

FIG. 2 shows a vertical sectional diagram of a state in which each leg portion 42 of the headrest stay 40 is inserted into the headrest support 20. In FIG. 2, a central axis of the leg portion 42 of the headrest stay 40 is depicted by a single-dot chain line CL. As shown in FIG. 2, a locking member 22 is disposed at the head portion 20A of the headrest support 20. As shown in FIG. 5, the locking member 22 is formed substantially in a plate shape overall and is provided with a pushing knob 22A. As shown in FIG. 2, the pushing knob 22A is disposed so as to be exposed from a portion of the head portion 20A of the headrest support 20 (in the drawings, a portion at the right side relative to the leg portion 42 of the headrest stay 40).

As shown in FIG. 5, a penetrating hole 22H is formed in the locking member 22. The leg portion 42 of the headrest stay 40 (see FIG. 3) penetrates through the penetrating hole 22H. A lock plate 24 is fixed to a lower portion of the locking member 22 at the opposite side thereof from the side at which the pushing knob 22A is disposed. The lock plate 24 is fabricated of metal and is formed in a plate shape with a substantially rectangular shape and a smaller thickness than the locking member 22. A portion of the lock plate 24 serves as a lock portion 24A, which is disposed in the penetrating hole 22H. A shaft-shaped protruding portion 22B is formed protruding from the locking member 22 at the opposite side thereof from the side at which the pushing knob 22A is disposed. A return spring 26 (an element that may broadly be understood as an urging member) that is a compression coil spring is disposed so as to be wound round the outer peripheral side of the protruding portion 22B. An extension and compression direction length of the return spring 26 is specified to be longer than a protrusion direction length of the protruding portion 22B.

As shown in FIG. 2, the protruding portion 22B and the return spring 26 are accommodated inside the head portion 20A of the headrest support 20. In FIG. 2, the return spring 26 is simplified to facilitate viewing of the diagram; a number of windings of the return spring 26 is depicted as being smaller than the number of windings of the return spring 26 depicted in FIG. 5.

According to the structure described above, the pushing knob 22A shown in FIG. 2 is operable by being pushed in a direction toward the axial center side of the headrest support 20, in opposition to urging force of the return spring 26. The lock portion 24A is provided at the headrest support 20, and is provided to be capable of projecting from and retracting into a tube inner peripheral face of the headrest support 20 while being urged toward the tube inner side of the headrest support 20 by the urging force of the return spring 26.

Figure 3:
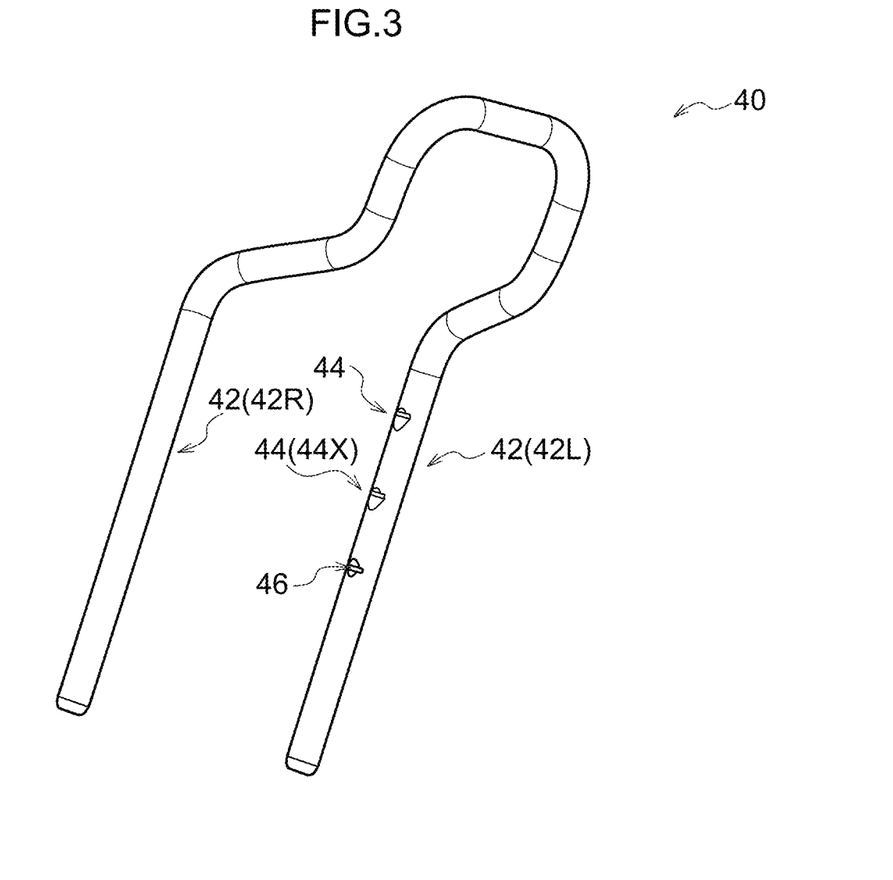
FIG. 3 is a perspective diagram showing overall structure of the headrest stay in FIG. 1.

As shown in FIG. 3, a plural number (for example, two) of height adjustment recess portions 44, which are recessed toward a center side of the leg portion 42, are formed in the one leg portion 42L of the pair of leg portions 42 of the headrest stay 40 so as to be arrayed in line along the axial direction of the leg portion 42. The height adjustment recess portions 44 are for engaging with the headrest stay 40 at a time of height adjustment, and are formed in a region at the seat width direction inner side of the one leg portion 42L. That is, as illustrated in FIG. 2, the lock portion 24A of the lock plate 24 is capable of entering the height adjustment recess portions 44.

Each height adjustment recess portion 44 is provided with an engaged surface 44A at the upper end side thereof. The engaged surface 44A is a flat face along a direction orthogonal to the axial direction of the leg portion 42 and faces the lower side. The engaged surface 44A is a surface that is engaged with and supported by the lock portion 24A of the lock plate 24 from the lower side at a time of height adjustment of the headrest stay 40. The height adjustment recess portion 44 is further provided with a descending face 44B, which connects with and descends from the engaged surface 44A, and an angled face 44C, which connects with the lower side of the descending face 44B and is angled to the opposite side from the center side of the leg portion 42 toward the lower side. The angled face 44C is a structural portion that helps to make lock-release unnecessary when the headrest stay 40 is pulled up from a state in which the engaged surface 44A is engaged with the lock portion 24A of the lock plate 24. The urging force from the return spring 26 that acts on the lock portion 24A is set to, for example, a standard value that is employed in consideration of both locking performance when the lock portion 24A is disposed at a locking position in the height adjustment recess portions 44 and operability when the headrest stay 40 is moved in the vertical direction for height adjustment.

As shown in FIG. 3, a detachment prevention slot portion 46, which is recessed toward the center side of the leg portion 42, is formed in the one leg portion 42L of the pair of leg portions 42 of the headrest stay 40. The detachment prevention slot portion 46 may be identified as a notch or incision. The detachment prevention slot portion 46 is formed at a position arrayed in line with the plural height adjustment recess portions 44, being set at the lower side in the axial direction of the leg portion 42 relative to the lowermost height adjustment recess portion of the plural height adjustment recess portions 44 (which in the drawings is marked in parentheses with the reference symbol 44X after the reference symbol 44). The lock portion 24A of the lock plate 24 shown in FIG. 2 is capable of entering into the detachment prevention slot portion 46. That is, the locking member 22, the lock plate 24, the return spring 26 and the detachment prevention slot portion 46 constitute a structural portion for preventing disengagement of the headrest 30 (see FIG. 1) at a time of frontal collision or the like.

As shown in FIG. 2, the detachment prevention slot portion 46 is provided with a first flat face portion 46A and a second flat face portion 46B. The first flat face portion 46A is a flat face along a direction orthogonal to the axial direction of the leg portion 42 and faces the lower side. The second flat face portion 46B is a flat face along another direction orthogonal to the axial direction of the leg portion 42 and faces the upper side. The second flat face portion 46B includes an opposing portion opposing the first flat face portion 46A, and includes a region that is disposed at the outer peripheral side of the leg portion 42 relative to the first flat face portion 46A in a vertical sectional view cut along the axial direction of the leg portion 42.

Figure 4:
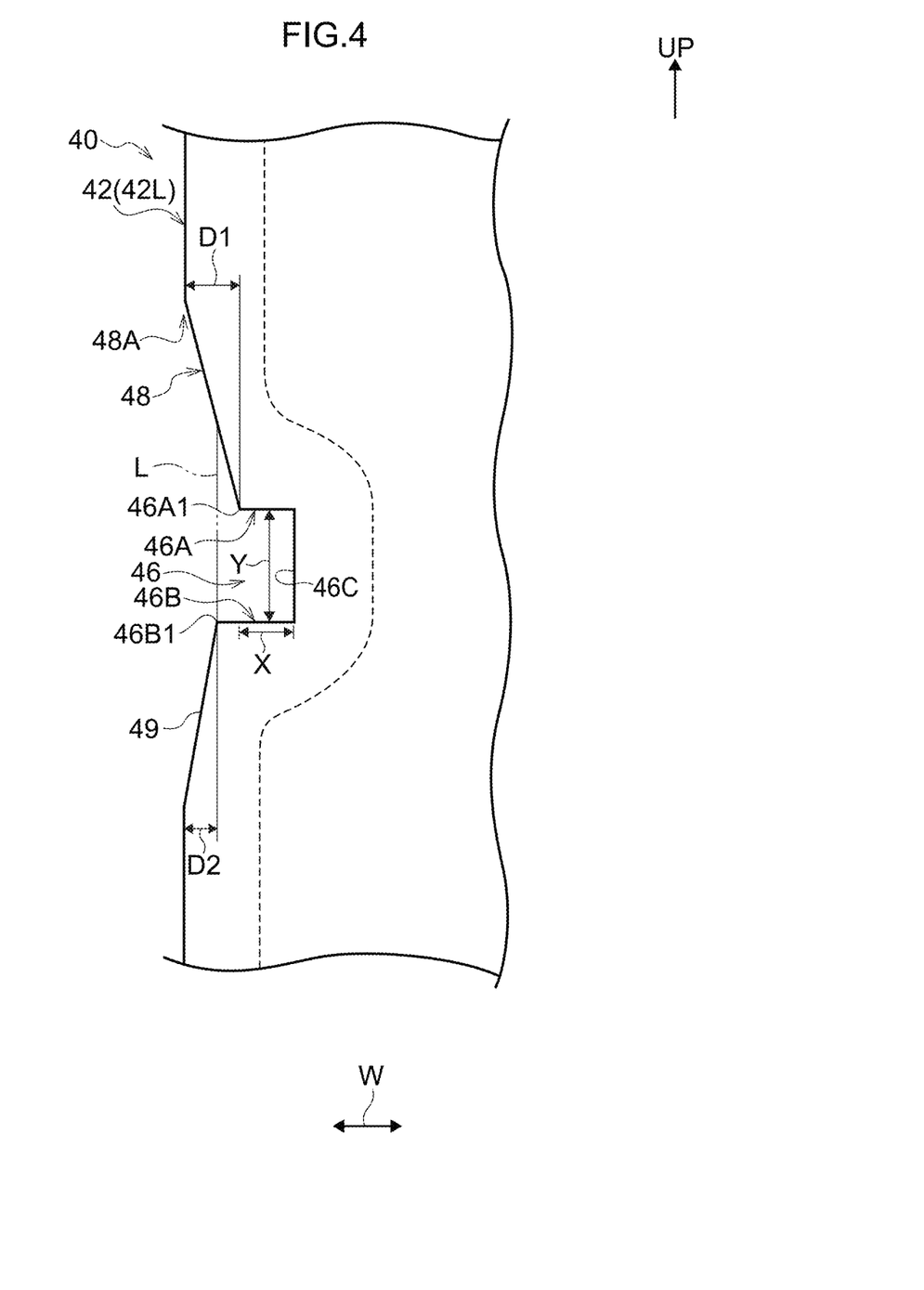
FIG. 4 is a diagram showing a state seen from a leg portion front side in which a detachment prevention slot portion of the headrest stay in FIG. 2 and surrounding portions are magnified.

FIG. 4 is a magnified diagram showing a state of the detachment prevention slot portion 46 of the headrest stay 40 and surrounding portions as seen from the front side of the leg portion 42. As shown in FIG. 4, an end of the first flat face portion 46A at the center side of the leg portion 42 thereof and an end of the second flat face portion 46B at the center side of the leg portion 42 thereof are linked by a slot floor portion 46C. That is, the detachment prevention slot portion 46 is formed by the first flat face portion 46A, the second flat face portion 46B and the slot floor portion 46C. As seen in an extension direction of the detachment prevention slot portion 46 (the direction of view in FIG. 4), the slot floor portion 46C is formed, as an example, along a directional orthogonal to the first flat face portion 46A and the second flat face portion 46B.

The detachment prevention slot portion 46 is formed so as to ensure a length X in a slot depth direction of a mutual opposition region between the first flat face portion 46A and the second flat face portion 46B of at least 0.3 mm. An opposition space Y between the first flat face portion 46A and the second flat face portion 46B is preferably specified to have a thickness of 1.4 to 2.0 times a thickness of the lock portion 24A in the direction of opposition of the first flat face portion 46A and second flat face portion 46B (see FIG. 2). The thickness of the opposition space Y is specified to be in this range in the present exemplary embodiment.

An upper side angled face portion 48 is formed at the one leg portion 42 (42L). The upper side angled face portion 48 is provided adjacent to the upper side of the detachment prevention slot portion 46. The upper side angled face portion 48 is angled, from the upper end thereof to the lower side, toward the center side of the leg portion 42 (42L), and connects with an edge 46A1 at the outer peripheral side of the first flat face portion 46A. A virtual straight line L that extends to the upper side in parallel with the axial direction of the leg portion 42 from an edge 46B1 at the outer peripheral side of the second flat face portion 46B is specified so as to intersect with a region of the upper side angled face portion 48 other than an upper edge 48A thereof. A lower side angled face portion 49 is also formed at the one leg portion 42 (42L). The lower side angled face portion 49 is provided adjacent to the lower side of the detachment prevention slot portion 46. The lower side angled face portion 49 is angled, from the lower end thereof to the upper side, toward the center side of the leg portion 42 (42L), and connects with the edge 46B1 at the outer peripheral side of the second flat face portion 46B.

To further describe the structure shown in FIG. 4, if an offset between a seat width direction inner side end of an outer peripheral face of a general portion of the one leg portion 42 (42L) and the edge 46A1 at the outer peripheral side of the first flat face portion 46A is represented by D1, and an offset between the seat width direction inner side end of the outer peripheral face of the general portion of the one leg portion 42 (42L) and the edge 46B1 at the outer peripheral side of the second flat face portion 46B is represented by D2, D1 is greater than D2.

Figure 6A:
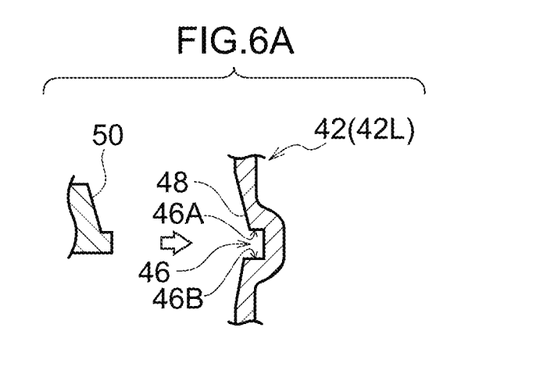
FIG. 6A is a sectional diagram showing a forming piece or such for forming the detachment prevention slot portion in FIG. 4.
Figure 6B:
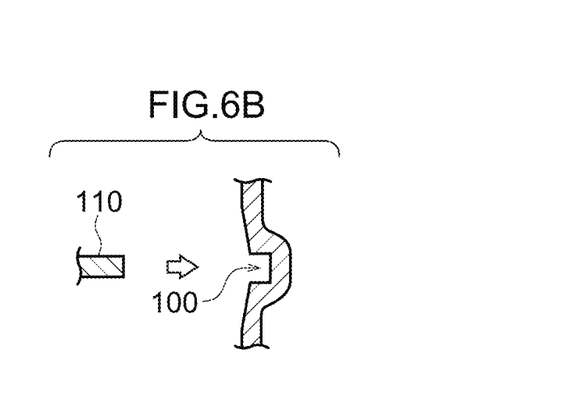
FIG. 6B is a sectional diagram showing a forming piece or such for forming a detachment prevention slot portion according to a conventional technology.

Now, a forming piece for forming the detachment prevention slot portion 46 in the shape shown in FIG. 4 is briefly described. FIG. 6B shows a sectional diagram of a detachment prevention slot portion 100 according to a conventional technology and a forming piece 110 for forming the detachment prevention slot portion 100. FIG. 6A shows the detachment prevention slot portion 46 according to the present exemplary embodiment and a forming piece 50 for forming the detachment prevention slot portion 46. The outline arrows in FIG. 6A and FIG. 6B indicate pressing directions of the forming pieces 50 and 110 during press-forming.

As shown in FIG. 6B, the conventional press-forming employs the forming piece 110 corresponding to the detachment prevention slot portion 100. In contrast, as shown in FIG. 6A, the press-forming according to the present exemplary embodiment employs the forming piece 50 with the shape corresponding to the detachment prevention slot portion 46 and the upper side angled face portion 48. As a result, a shape may be formed in which, in a vertical sectional diagram cut along the axial direction of the leg portion 42, a portion of the second flat face portion 46B is disposed further to the outer peripheral side of the leg portion 42 than the first flat face portion 46A.

Operation and Effects

Now, operation and effects of the present exemplary embodiment are described with reference when appropriate to the schematic diagram shown in FIG. 7.

In the present exemplary embodiment, the detachment prevention slot portion 46 that is recessed toward the center side of the leg portion 42 is formed in the rod-shaped leg portion 42 of the headrest stay 40 shown in FIG. 2. The lock portion 24A of the lock plate 24 is capable of entering the detachment prevention slot portion 46. This detachment prevention slot portion 46 is provided with the downward-facing first flat face portion 46A at the upper end side and is provided with the upward-facing second flat face portion 46B at the lower end side. The second flat face portion 46B includes an opposing portion opposing the first flat face portion 46A, and includes a region that, in a vertical sectional diagram cut along the axial direction of the leg portion 42, is disposed at the outer peripheral side of the leg portion 42 relative to the first flat face portion 46A.

Figure 7:
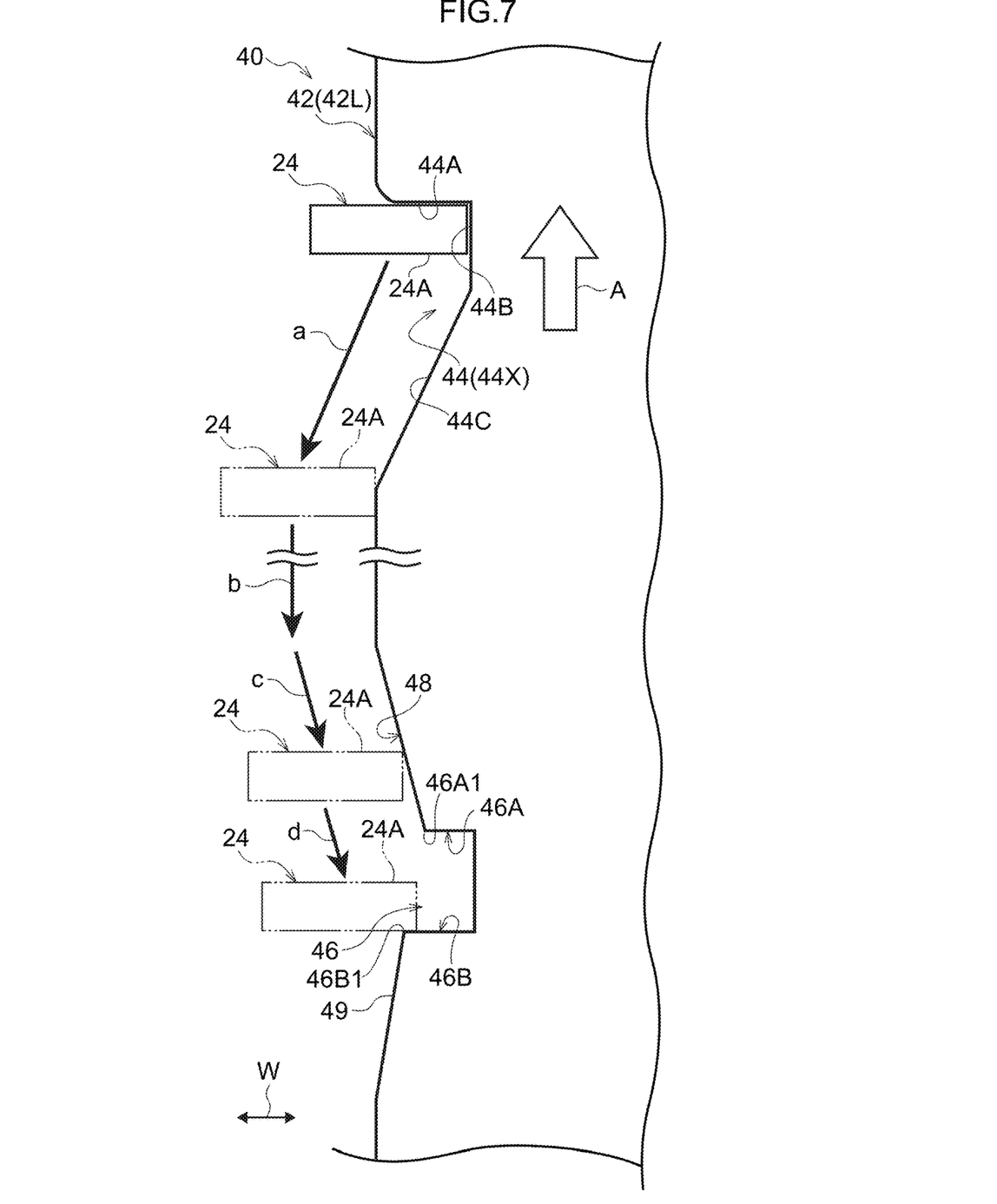
FIG. 7 is a schematic diagram for describing operation of the headrest stay and retaining structure in FIG. 2.

Therefore, when the headrest stay 40 shown in FIG. 7 acts to move to the upper side at a high speed (see the direction of arrow A), for example, during a frontal collision, and the lock plate 24 relatively moves to the lower side with respect to the leg portion 42 of the headrest stay 40 (see arrows a, b, c and d), even if the lock portion 24A of the lock plate 24 cannot enter into the opposition space between the first flat face portion 46A and second flat face portion 46B of the detachment prevention slot portion 46, a distal end portion of the lock portion 24A may abut against the second flat face portion 46B. Then, when the distal end portion of the lock portion 24A abuts against the second flat face portion 46B, displacement of the headrest stay 40 is restricted, and the lock portion 24A may be allowed to enter into the opposition space between the first flat face portion 46A and second flat face portion 46B of the detachment prevention slot portion 46. Therefore, detachment of the headrest stay 40 from the headrest support 20 (see FIG. 2) may be prevented with a simple structure.

In the present exemplary embodiment, the upper side angled face portion 48 formed at the leg portion 42 is provided adjacent to the upper side of the detachment prevention slot portion 46, is angled toward the center side of the leg portion 42 from the upper end to the lower side, and connects with the edge 46A1 at the peripheral outer side of the first flat face portion 46A. Therefore, when the headrest stay 40 acts to move to the upper side (see the direction of arrow A) at high speed, the upper side angled face portion 48 may guide the lock portion 24A so as to facilitate entry of the lock portion 24A into the opposition space of the detachment prevention slot portion 46 between the first flat face portion 46A and second flat face portion 46B.

In the present exemplary embodiment, as shown in FIG. 4, the virtual straight line L that extends to the upper side in parallel with the axial direction of the leg portion 42 from the edge 46B1 at the outer peripheral side of the second flat face portion 46B is specified so as to intersect with a region of the upper side angled face portion 48 other than the upper edge 48A. Therefore, even if an undercut is formed in a region adjacent to the lower side of the edge 46B1 at the outer peripheral side of the second flat face portion 46B due to press-forming, an effective structure is formed. Thus, fabrication may be easier.

To describe this further, in the present exemplary embodiment, the lower side angled face portion 49 formed at the leg portion 42 is provided adjacent to the lower side of the detachment prevention slot portion 46, is angled toward the center side of the leg portion 42 from the lower end to the upper side, and connects with the edge 46B1 at the outer peripheral side of the second flat face portion 46B. That is, this structure tolerates an undercut formed in a region adjacent to the lower side of the edge 46B1 at the outer peripheral side of the second flat face portion 46B due to press-forming. Therefore, fabrication by press-forming may be easier.

As shown in FIG. 3, the plural height adjustment recess portions 44 that are recessed toward the center side of the leg portion 42 are formed in the leg portion 42 so as to be arrayed in line along the axial direction of the leg portion 42. As shown in FIG. 2, the lock portion 24A of the lock plate 24 is capable of entering the height adjustment recess portions 44. The detachment prevention slot portion 46 is formed at a position arrayed in line with the plural height adjustment recess portions 44. Therefore, the lock portion 24A may be employed as inserting means into both the height adjustment recess portions 44 and the detachment prevention slot portion 46. Thus, structures may be simplified.

As shown in FIG. 3, the detachment prevention slot portion 46 is set at the lower side in the axial direction of the leg portion 42 relative to the lowermost height adjustment recess portion 44X of the plural height adjustment recess portions 44. Therefore, the height adjustment recess portions 44 may be utilized to adjust the height of the headrest stay 40, and the detachment prevention slot portion 46 may be utilized to prevent detachment of the headrest stay 40 from the headrest support 20 shown in FIG. 2 (see FIG. 2) when the headrest stay 40 acts to move to the upper side at high speed.

The detachment prevention slot portion 46 shown in FIG. 4 is formed so as to ensure the length X in the slot depth direction of the mutual opposition region between the first flat face portion 46A and second flat face portion 46B is at least 0.3 mm. Therefore, when the lock portion 24A of the lock plate 24 enters into the opposition space of the detachment prevention slot portion 46 between the first flat face portion 46A and second flat face portion 46B, disengagement of the lock portion 24A may be excellently prevented.

In the present exemplary embodiment, the opposition space Y between the first flat face portion 46A and second flat face portion 46B is specified to have a thickness of 1.4 to 2.0 times the thickness of the lock portion 24A in the direction of opposition of the first flat face portion 46A and second flat face portion 46B (see FIG. 2). Because the opposition space Y between the first flat face portion 46A and second flat face portion 46B is specified to have a thickness of at least 1.4 times the thickness of the lock portion 24A (see FIG. 2), specification for the lock portion 24A of the lock plate 24 (see FIG. 2) to enter into the opposition space of the detachment prevention slot portion 46 between the first flat face portion 46A and second flat face portion 46B when the headrest stay 40 acts to move to the upper side at high speed is easier. Further, because the opposition space Y between the first flat face portion 46A and second flat face portion 46B is specified to have a thickness of at most 2.0 times the thickness of the lock portion 24A (see FIG. 2), rattling of the lock portion 24A (see FIG. 2) inserted into the opposition space of the detachment prevention slot portion 46 between the first flat face portion 46A and second flat face portion 46B may be suppressed.

According to the present exemplary embodiment as described above, with a simple structure, the headrest stay 40 shown in FIG. 2 may be prevented from detaching from the headrest support 20 when the headrest stay 40 acts to move to the upper side at a high speed. Further, when this design concept is employed as in the present exemplary embodiment, freedom of design of component specifications relating to whether or not the headrest stay 40 may disengage-such as a sliding angle of the headrest stay 40 (an inclination angle of an upper-and-lower direction of the headrest stay 40 relative to an upper-and-lower direction of the seatback 12 (see FIG. 1)), a maximum weight of the headrest 30 (see FIG. 1), and so forth—may be broader than with a conventional technology.

Supplementary Descriptions of the Exemplary Embodiment

In the exemplary embodiment described above, as shown in FIG. 3, the detachment prevention slot portion 46 is formed at a position arrayed in line with the plural height adjustment recess portions 44. However, as a variant example of the exemplary embodiment described above, a structure may be employed in which a detachment prevention slot (46) is formed at a position of a leg portion (42) of a headrest stay (40) other than a position arrayed in line with plural height adjustment recess portions (44).

For example: a structure may be employed in which plural height adjustment recess portions (44) are formed at one side of one leg portion (42L) of a pair of leg portions (42) of a headrest stay (40) as seen from the central axis of the one leg portion (42L), and a detachment prevention slot portion (46) is formed at the other side of the one leg portion (42L); and a structure may be employed in which plural height adjustment recess portions (44) are formed at one leg portion (42L) of a pair of leg portions (42) of a headrest stay (40), and a detachment prevention slot portion (46) is formed at the other leg portion (42R). Headrest stays according to each of these variant examples are employed in a set with a headrest support (20) at which locking mechanisms (for example, mechanisms equipped with a locking member (22), a lock plate (24) and a return spring (26)) are provided so as to respectively correspond with the plural height adjustment recess portions (44) and the detachment prevention slot portion (46) according to the variant example.

In the exemplary embodiment described above, the detachment prevention slot portion 46 is set at the lower side in the axial direction of the leg portion 42 relative to the lowermost height adjustment recess portion 44X of the plural height adjustment recess portions 44. However, as a variant example of the present exemplary embodiment, a structure may be employed in which a detachment prevention slot portion (46) is set at the same height position in the axial direction of a leg portion (42) as a lowermost height adjustment recess portion (44X). This variant example is a variant example of the structures in which a detachment prevention slot portion (46) is formed at a position of a leg portion (42) of a headrest stay (40) other than a position arrayed in line with the plural height adjustment recess portions (44).

In the exemplary embodiment described above, the plural height adjustment recess portions 44 are formed in the one leg portion 42L of the pair of leg portions 42 of the headrest stay 40. However, as a variant example of the exemplary embodiment described above, a structure may be employed in which plural height adjustment recess portions (44) are not provided in a leg portion (42) of a headrest stay (40) and a mechanism is formed that does not use engagement of a lock at a time of height adjustment of the headrest stay (40).

In the exemplary embodiment described above, as shown in FIG. 4, the upper side angled face portion 48 is formed adjacent to the upper side of the detachment prevention slot portion 46, which is a preferable structure. However, as a variant example of the exemplary embodiment described above, a structure may be employed in which, for example, the outer diameter of a portion of one leg portion (42L) of a headrest stay (40) at the same vertical direction position as a lower end position of a detachment prevention slot portion (46) is specified to be a little larger than an outer diameter of a portion at the same vertical direction position as an upper end position of the detachment prevention slot portion (46). In this structure, a second flat face portion (46B) includes a region disposed further to the outer peripheral side of the one leg portion (42L) than a first flat face portion (46A) in a vertical sectional diagram cut along the axial direction of the one leg portion (42L), but a region corresponding with the upper side angled face portion 48 according to the present exemplary embodiment is not formed.

In the exemplary embodiment described above, the virtual straight line L that extends to the upper side in parallel with the axial direction of the leg portion 42 from the edge 46B1 at the outer peripheral side of the second flat face portion 46B is specified so as to intersect with a region of the upper side angled face portion 48 other than the upper edge 48A, which is a preferable structure with regard to ease of fabrication. However, as a variant example of the exemplary embodiment described above, a virtual straight line (L) that extends to the upper side in parallel with the axial direction of a leg portion (42) from an edge (46B1) at the outer peripheral side of a second flat face portion (46B) may be specified so as to intersect with an upper edge (48A) of an upper side angled face portion (48).

In the exemplary embodiment described above, the lower side angled face portion 49 is formed adjacent to the lower side of the detachment prevention slot portion 46, which is a preferable structure with regard to ease of fabrication. However, as a variant example of the exemplary embodiment described above, a structure may be employed in which no portion corresponding to the lower side angled face portion 49 is formed at a lower side of a detachment prevention slot portion (46).

In the exemplary embodiment described above, the detachment prevention slot portion 46 is formed so as to ensure the length X in the slot depth direction of the mutual opposition region between the first flat face portion 46A and second flat face portion 46B is at least 0.3 mm, which is a preferable structure. However, a structure may be employed in which a length (X) in a slot depth direction of a mutual opposition region between a first flat face portion (46A) and a second flat face portion (46B) is a little smaller than 0.3 mm, for example, when an urging force acting on a lock portion (24A) from a return spring (26) is larger than in the exemplary embodiment described above, or the like.

In the exemplary embodiment described above, the opposition space Y between the first flat face portion 46A and second flat face portion 46B is specified to have a thickness of 1.4 to 2.0 times the thickness of the lock portion 24A in the direction of opposition of the first flat face portion 46A and second flat face portion 46B (see FIG. 2), which is a preferable structure. However, a specification other than this specification may be employed. An opposition space (Y) between a first flat face portion (46A) and a second flat face portion (46B) may be specified to be less than 1.4 times the thickness of a lock portion (24A) and may be specified to be slightly greater than 2.0 times the thickness of the lock portion (24A), for example, when an urging force acting on the lock portion (24A) from a return spring (26) is larger than in the exemplary embodiment described above, or the like.

The exemplary embodiment described above and the numerous variant examples mentioned above may be embodied in suitable combinations.

Hereabove, examples of the present disclosure have been described, but the present disclosure is not limited by these descriptions and it will be clear that numerous modifications beyond these descriptions may be embodied within a technical scope not departing from the gist of the invention.

What is claimed is:

1. A headrest stay configured to be inserted from an upper side into a headrest support and to be mounted thereat, the headrest support being formed as a tube, and a lock portion being provided at the headrest support, the lock portion being configured to project from and retract into an inner peripheral face of the tube while being urged toward an inner side of the tube, the headrest stay comprising:
   a detachment prevention slot portion formed in a rod-shaped leg portion that is inserted into the headrest support, the detachment prevention slot portion being recessed toward a center side of the leg portion, the lock portion being configured to enter into the detachment prevention slot portion, and the detachment prevention slot portion including:
      a first flat face portion that is a flat face along a direction orthogonal to an axial direction of the leg portion and that faces a lower side; and
      a second flat face portion that is a flat face along another direction orthogonal to the axial direction of the leg portion and that faces an upper side, the second flat face portion including:
         an opposing portion that opposes the first flat face portion; and
         a region that, in a vertical sectional diagram cut along the axial direction of the leg portion, is disposed at an outer peripheral side of the leg portion relative to the first flat face portion; and
      an upper side angled face portion formed at the leg portion, wherein the upper side angled face portion is:
         provided adjacent to the upper side of the detachment prevention slot portion;
         angled, from an upper end to the lower side, toward the center side of the leg portion; and
         connected to an edge at an outer peripheral side of the first flat face portion,
   wherein a virtual straight line that extends toward the upper side in parallel with the axial direction of the leg portion from an edge at an outer peripheral side of the second flat face portion, intersects with a region of the upper side angled face portion other than an upper edge thereof.

2. The headrest stay according to claim 1, further comprising a lower side angled face portion formed at the leg portion, wherein the lower side angled face portion is:
   provided adjacent to the lower side of the detachment prevention slot portion,
   angled, from a lower end to the upper side, toward the center side of the leg portion, and
   connected to an edge at an outer peripheral side of the second flat face portion.

3. The headrest stay according to claim 1, further comprising a plurality of height adjustment recess portions formed in the leg portion, the height adjustment recess portions being recessed toward the center side of the leg portion, the lock portion being configured to enter into the height adjustment recess portions, and the height adjustment recess portions being arrayed in a line along the axial direction of the leg portion,
   wherein the detachment prevention slot portion is formed at a position arrayed in a line with the plurality of height adjustment recess portions.

4. The headrest stay according to claim 1, further comprising a plurality of height adjustment recess portions formed in the leg portion, the height adjustment recess portions being recessed toward the center side of the leg portion, being configured for engagement at a time of height adjustment of the headrest stay, and being arrayed in a line along the axial direction of the leg portion,
   wherein the detachment prevention slot portion is disposed:
      at a lower side in the axial direction of the leg portion relative to a lowermost height adjustment recess portion of the plurality of height adjustment recess portions, or
      at a same height position in the axial direction of the leg portion as the lowermost height adjustment recess portion.

5. The headrest stay according to claim 1, wherein the detachment prevention slot portion is formed so as to ensure a length of at least 0.3 mm in a slot depth direction of a mutual opposition region between the first flat face portion and the second flat face portion.

6. A retaining structure of a headrest stay, comprising:
   the headrest stay according to claim 1;
   a headrest support formed as a tube, the headrest stay being inserted into the headrest support from an upper side and being mounted thereat; and
   a lock portion provided at the headrest support, the lock portion being configured to project from and retract into a tube inner peripheral face of the headrest support while being urged toward a tube inner side of the headrest support,
   wherein an opposition space between the first flat face portion and the second flat face portion has a thickness in a direction of opposition between the first flat face portion and second flat face portion that is a factor of from 1.4 to 2.0 times a thickness of the lock portion.

7. A headrest stay configured to be inserted from an upper side into a headrest support and to be mounted thereat, the headrest support being formed as a tube, and a lock portion being provided at the headrest support, the lock portion being configured to project from and retract into an inner peripheral face of the tube while being urged toward an inner side of the tube, the headrest stay comprising:

a detachment prevention slot portion formed in a rod-shaped leg portion that is inserted into the headrest support, the detachment prevention slot portion being recessed toward a center side of the leg portion, the lock portion being configured to enter into the detachment prevention slot portion, and the detachment prevention slot portion including:
- a first flat face portion that is a flat face along a direction orthogonal to an axial direction of the leg portion and that faces a lower side; and
- a second flat face portion that is a flat face along another direction orthogonal to the axial direction of the leg portion and that faces an upper side, the second flat face portion including:
  - an opposing portion that opposes the first flat face portion; and
  - a region that, in a vertical sectional diagram cut along the axial direction of the leg portion, is disposed at an outer peripheral side of the leg portion relative to the first flat face portion; and a lower side angled face portion formed at the leg portion, wherein the lower side angled face portion is:
- provided adjacent to the lower side of the detachment prevention slot portion;
- angled, from a lower end to the upper side, toward the center side of the leg portion; and
- connected to an edge at an outer peripheral side of the second flat face portion.

\* \* \* \* \*